(12) United States Patent
Einspieler et al.

(10) Patent No.: US 10,348,224 B2
(45) Date of Patent: Jul. 9, 2019

(54) MOTOR POSITION SENSOR DEVICE

(71) Applicant: ams AG, Unterpremstaetten (AT)

(72) Inventors: Roland Einspieler, Graz (AT); Christian Stockreiter, Graz (AT)

(73) Assignee: ams AG, Unterpremstaetten (AT)

( * ) Notice: Subject to any disclaimer, the term of this patent is extended or adjusted under 35 U.S.C. 154(b) by 445 days.

(21) Appl. No.: 14/917,930

(22) PCT Filed: Jul. 30, 2014

(86) PCT No.: PCT/EP2014/066386
§ 371 (c)(1),
(2) Date: Mar. 9, 2016

(87) PCT Pub. No.: WO2015/036162
PCT Pub. Date: Mar. 19, 2015

(65) Prior Publication Data
US 2016/0218646 A1    Jul. 28, 2016

(30) Foreign Application Priority Data

Sep. 10, 2013   (EP) ..................................... 13183765

(51) Int. Cl.
| | |
|---|---|
| H01L 25/07 | (2006.01) |
| H01L 25/18 | (2006.01) |
| H02P 6/16 | (2016.01) |
| H02P 29/024 | (2016.01) |
| H02J 9/06 | (2006.01) |

(52) U.S. Cl.
CPC .............. *H02P 6/16* (2013.01); *H02P 29/025* (2013.01); *H02J 9/06* (2013.01); *H02J 2009/068* (2013.01)

(58) Field of Classification Search
CPC ........... H02P 6/28; H02P 6/085; H02P 29/032
See application file for complete search history.

(56) References Cited

U.S. PATENT DOCUMENTS

| | | | |
|---|---|---|---|
| 4,831,469 A * | 5/1989 | Hanson ................. | G11B 19/04 318/376 |
| 5,414,336 A * | 5/1995 | Tsutsumi ........... | G05B 19/4062 318/140 |
| 5,760,707 A | 6/1998 | Katagiri | |
| 6,396,652 B1 | 5/2002 | Kawachi et al. | |
| 2007/0085500 A1* | 4/2007 | Son ........................ | H02P 6/182 318/400.41 |
| 2010/0236281 A1* | 9/2010 | Eom ..................... | F25D 23/021 62/449 |

FOREIGN PATENT DOCUMENTS

EP        2259265 A2    12/2010

* cited by examiner

*Primary Examiner* — Bickey Dhakal
*Assistant Examiner* — Charles S Laughlin
(74) *Attorney, Agent, or Firm* — Fish & Richardson P.C.

(57) ABSTRACT

A motor position sensor device comprises a motor position detection unit being configured to detect a position of a rotor of an electric motor. The motor position sensor device comprises a selection circuit being configured to couple a first supply terminal to provide a supply voltage to the motor position detection unit, if a level of the supply voltage is above the threshold level, and to couple a second supply terminal to provide an auxiliary supply voltage to the motor position detection unit, if the level of the supply voltage is below the threshold level and the level of the auxiliary supply voltage is above the threshold level.

13 Claims, 4 Drawing Sheets

MOTOR POSITION SENSOR DEVICE

TECHNICAL FIELD

The invention is directed to a motor position sensor device which may be used in a BLDC (Brushless Direct Current) motor to determine a position of a rotor of the motor. The invention is further directed to an electric motor with a motor position sensor, to an electric system to provide a supply voltage to a motor position sensor device of an electric motor and to an electric arrangement to control an electric motor.

BACKGROUND

An electric motor usually comprises a movable rotor which is surrounded by a stationary stator. The rotor may include a permanent magnet and the stator may include a plurality of coils, for example, three coils wick are driven by timely shifter alternating voltages as exciting voltages to generate a rotational magnetic field around the stator. The rotational magnetic field generates a moment of force at the permanently excited rotor. In order to enable a continuous rotational movement of the rotor, the rotational magnetic field has to be commutated at defined times in dependence on the current position of the rotor in the rotational magnetic field or in dependence on the current direction of the magnetic field of the permanent magnet of the rotor in the rotational field generated by the stator.

In applications with BLDC motors, the commutation of the rotational magnetic field is accomplished in dependence on the current position of the rotor in the rotational magnetic field of the coils of the stator, the revolution speed of the rotor and the motor torque. In order to detect the position of the rotor in the rotational magnetic field of the coils of the stator, the electric motor may comprise a motor position sensor device. The motor position sensor device may be formed as a chip which may be mounted on the movable rotor. The motor position sensor device may comprise a magnetic field detection sensor to detect the position of the rotor in relation to the arrangement of the coils of the stator. The motor position sensor device may transfer the detected position of the rotor to a motor control driver device coupled to the motor. The motor control driver device comprises a motor controller circuit to control the generation of the exciting alternating current voltages for applying to the coils of the stator to generate the rotational magnetic field.

The motor position sensor device has to be supplied by a supply voltage to operate the motor position sensor in an operation mode to detect the position of the rotor relative to the coils of the stator. Safety critical motor applications, for example safety critical BLDC motor applications, need to detect a disruption on the supply line to provide the supply voltage or any other failure in providing the supply voltage to guarantee a proper function of the motor.

It is desirable to provide a motor position sensor device which enables a reliable operation of the motor position sensor device in case of a disruption of a supply voltage of the motor position sensor device. A further concern is to provide an electric motor which enables a reliable operation of the electric motor in case of a disruption of a supply voltage of a motor position sensor device of the electric motor. A further need is to provide an electric system to provide a supply voltage to a motor position sensor device of an electric motor which enables a reliable operation of the motor position sensor device in case of a disruption of the supply voltage of the motor position sensor device. Another concern is to provide an electric arrangement to control an electric motor such that a proper function of the electric motor is ensured in case of a disruption of a supply voltage of a motor position sensor device of the electric motor to detect a position of the motor.

SUMMARY

A motor position sensor device which enables a reliable operation of the motor position sensor device in case of a disruption of the supply voltage of the motor position sensor device is specified in claim 1. According to an embodiment of the motor position sensor device the motor position sensor device comprises a first supply terminal to supply a first supply voltage and a second supply terminal to supply a second supply voltage. The motor position sensor device further comprises a motor position detection unit being configured to detect a position of a rotor of a motor in an operation mode of the motor position sensor device and a selection circuit to selectively couple one of the first and second supply terminal to the motor position detection unit. The motor position sensor device is configured to be operated in the operation mode, if one of the first and second supply voltage is provided to the motor position detection unit with a voltage level above a threshold level. The selection circuit is configured to couple the first supply terminal to the motor position detection unit, if a level of the first supply voltage is above the threshold level. The selection circuit is configured to couple the second supply terminal to the motor position detection unit, if the level of the first supply voltage is below the threshold level and the level of the second supply voltage is above the threshold level.

An embodiment of an electric motor which enables a reliable operation of the electric motor in case of a disruption of a supply voltage of a motor position sensor device of the electric motor is specified in claim 5. The electric motor comprises a motor position sensor device according to an embodiment as specified above. The electric motor comprises a rotor, wherein the motor position sensor device is arranged such that the motor position sensor device is coupled to the movement of the rotor. To this purpose, the motor position sensor may be directly mounted to the rotor.

An electric system to provide a supply voltage to a motor position sensor device of an electric motor is specified in claim 8. The electric system comprises an electric motor according to an embodiment as specified above and a supply voltage generation device having an input side to apply the respective exciting alternating current voltages and an output side to provide the second supply voltage. The supply voltage generation device is configured to generate the second supply voltage in dependence on at least one of the exciting alternating current voltages. The second supply terminal of the motor position sensor device is connected to the output side of the supply voltage generation circuit.

An electric arrangement to control an electric motor such that a proper function of the electric motor is ensured in case of a disruption of a supply voltage of a motor position sensor device of the electric motor to detect a position of the motor is specified in claim 14. According to an embodiment of the electric arrangement, the electric arrangement comprises an electric system to provide a supply voltage to a motor position sensor device of an electric motor according to an embodiment as specified above. The electric arrangement comprises a motor control driver device to control the electric motor and the motor position sensor device. The motor control driver device comprises an exciting alternat- ing current voltage generation circuit to generate the exciting AC (alternating current) voltages at supply lines between the motor control driver device and the motor and a motor controller circuit to control the generation of the exciting AC voltages. The motor position sensor device is configured to provide evaluation signals indicating the position of the rotor of the electric motor to the motor controller circuit. The motor controller circuit controls the generation of the exciting AC voltages by the exciting alternating current voltage generation circuit in dependence on the evaluation signals of the motor position sensor device.

According to the present invention, the motor position sensor device may be supplied at a first supply terminal with a first supply voltage which may be especially provided only for that purpose by a motor control driver device. The motor position sensor device may comprise a second supply terminal to provide a second supply voltage which is used as an auxiliary supply voltage. The motor position sensor device may comprise a selection circuit to select the first supply voltage for supplying the motor position sensor device with the supply voltage, if the first supply voltage is provided by the motor control driver device with an amount which is sufficiently high to operate the motor position sensor device to detect the position of the rotor in relation to the stationary stator of the electric motor.

The selection circuit is configured to select the second supply voltage to supply the motor position sensor device with the second supply voltage for detecting the position of the rotor in relation to the stator, if the provision of the first supply voltage is disruptet. The second supply voltage serves as a backup power supply voltage which may be coupled out of supply lines of the electric motor. In the case that the electric motor is configured as a BLDC motor, such supply lines may be provided between the motor control driver device and the BLDC motor to provide exciting AC voltages to the coils of the stator to generate a rotational magnetic field.

The electric system to provide a supply voltage to the motor position sensor device of the electric motor may comprise a coupling device to couple at least one of the exciting AC voltages out of the respective one of the supply lines. The coupling device may be configured to inductively or capacitively or galvanically couple at least one of the exciting alternating current voltages out of the supply lines.

The coupling unit may be connected to an input side of a supply voltage generation device to provide the coupled out one of the at least one exciting alternating current voltages to the input side of the supply voltage generation device. The supply voltage generation device is configured to change the coupled out exciting alternating current voltage to the second supply voltage to operate the motor position sensor device for detecting the position of the rotor, if the provision of the first supply voltage is broken. To this purpose, the supply voltage generation circuit may comprise a voltage divider circuit to generate a reduced voltage level in relation to the level of the coupled out exciting alternating current voltage, a rectifier circuit to rectify the reduced voltage and a smoothing circuit to smooth the rectified voltage.

Any layout structures being configured to couple electromagnetic energy out of the supply lines may be used for energy harvesting. Mutual coupling between the power lines to provide the exciting alternating current voltages for the coils of the stator of the electric motor and special layout structures of a printed circuit board of the motor position sensor device are used to generate transient currents. An attenuator circuit may be provided to protect subsequent blocks. The transient currents charge, for example, a capacitor and with a smoothing and regulator circuit the backup power supply is generated for the motor position sensor device. These blocks can be realized on or off chip. The reaction time of the backup supply must guarantee functionality of the electric motor, for example, the BLDC motor without interruptions. Lower performance in backup supply modus is feasible and sometimes required. This depends on specific customer requirements.

It is to be understood that both the foregoing general description and the following detailed description present embodiments and are intended to provide an overview or a framework for understanding the nature and character of the disclosure. The accompanying drawings are included to provide a further understanding, and are incorporated into and constitute a part of this specification. The drawings illustrate various embodiments and, together with the description, serve to explain the principles and operation of the concepts disclosed.

DETAILED DESCRIPTION

Figure 1:
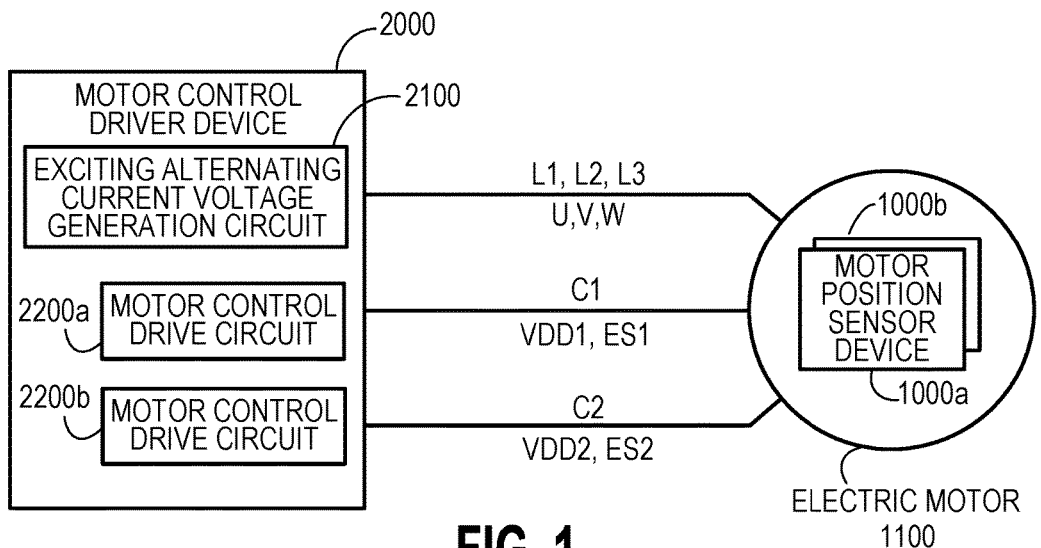
FIG. 1 shows an embodiment of an electric arrangement to control an electric motor.

FIG. 1 shows an embodiment of an electric arrangement to control an electric motor. The electric arrangement comprises motor position sensor devices 1000a, 1000b and an electric motor 1100. The motor position sensor devices 1000a, 1000b are configured to detect a position of a rotor of the electric motor 1100. The electric motor 1100 may be configured as a BLDC motor comprising a stationary stator with a plurality of coils being excited by exciting alternating current voltages U, V, W provided on supply lines L1, L2, L3. The electric motor 1100 comprises a movable rotor which may comprise a permanent magnet. If the coils of the stator are excited by the exciting alternating current voltages U, V, W, a rotational magnetic field is generated in the stator of the electric motor which influences the rotor so that a continuous rotational movement of the rotor is caused, if the coils are driven by appropriate exciting voltages U, V, W.

The electric system further comprises a motor control driver device 2000 to control the electric motor 1100. The motor control driver device comprises an exciting alternating current voltage generation circuit 2100 to generate the exciting voltages U, V, W for supplying to the coils of the stator of the electric motor 1100. In the embodiment shown in FIG. 1 the electric motor 1100 may comprise three coils, wherein each of the coils is excited by one of the exciting alternating current voltages U, V, W to generate the rotional magnetic field in the electric motor 1100. It is also possible that more or less than three AC voltages are provided to excite a respective number of coils of the stator.

For reasons of simplicity, the electric arrangement is described in the following with the three exciting voltages U, V and W.

The motor control driver device 2000 comprises a motor controller circuit 2200a and a motor controller circuit 2200b. The motor controller circuit 2200a provides a supply voltage VDD1 via a channel C1 to the motor position sensor device 1000a to operate the motor position sensor device 1000a in an operation state in which the motor position sensor device 1000a detects a position of the rotor of the electric motor in relation to the coils of the stator and generates evaluation signals ES1 indicating the detected position of the rotor. The evaluation signals ES1 are transferred via the channel C1 for further evaluation to the motor controller circuit 2200a. The motor controller circuit 2200a evaluates the evaluation signals ES1 of the motor position sensor device 1000a and controls the exciting alternating current voltage generation circuit 2100 to generate the exciting voltages U, V, W in dependence on the evaluation signals ES1 of the motor position sensor device 1000a and thus in dependence on the current position of the rotor so that a continuous rotational movement of the rotor influenced by the rotational magnetic field of the coils of the stator can be obtained.

The motor position sensor device is supplied from the motor controller device 2200a by a supply voltage VDD1 via channel C1 to be operated in an operation mode in which the motor position sensor device 1000a detects the position of the rotor. The motor position sensor device 1000b is provided as a redundant motor position sensor device to guarantee the functioning of the electric motor 1100, if the provision of the supply voltage to the motor position sensor 1000a fails. The redundant motor position sensor device 1000b is supplied by a supply voltage VDD2 from the redundant motor controller circuit 2200b of the motor control driver device 2000. The supply voltage VDD2 for operating the redundant motor position sensor device 1000b is transferred to the motor position sensor device 1000b via channel C2.

If the provision of the supply voltage VDD1 on channel C1 is broken, the motor control driver receives the information regarding the position of the rotor of the electric motor 1100 from the redundant motor position sensor device 1000b. The evaluation signals ES2 generated by the redundant motor position sensor device 1000b are transferred via channel C2 to the redundant motor controller circuit 2200b which controls the exciting alternating current voltage generation circuit 2100 to generate the exciting voltages U, V, W in dependence on the evaluation signals ES2 of the motor position sensor device 1000b.

In order to guarantee the voltage supply and hence proper functionality of the electric motor the electric arrangement to control the electric motor is fully redundant by the redundant motor position sensor device 1000b, the redundant supply and data channel C2 and the redundant motor controller circuit 2200b.

Figure 2:
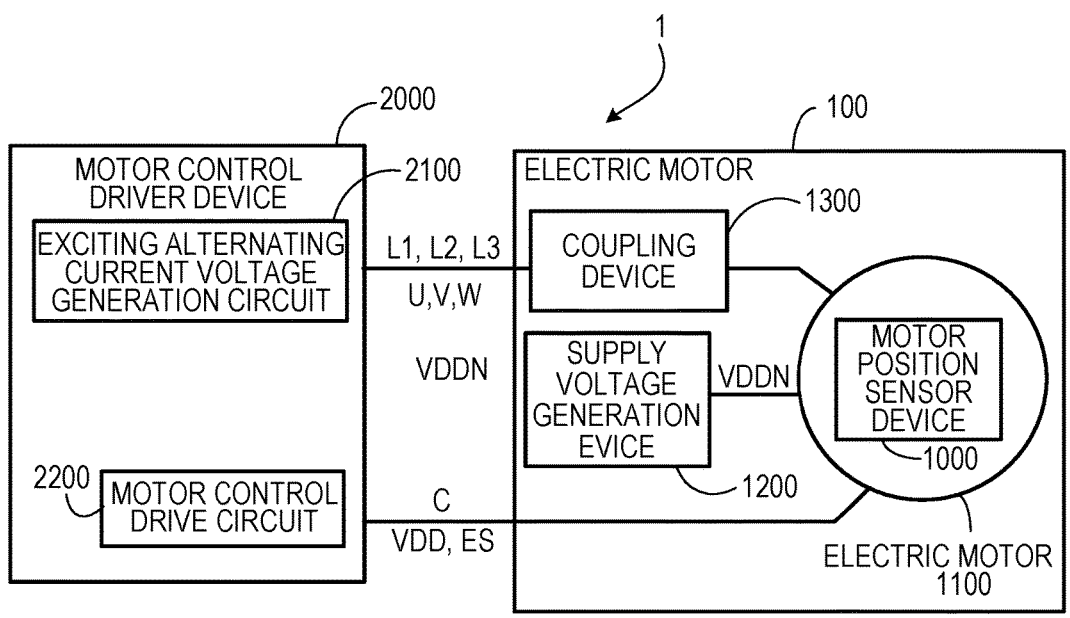
FIG. 2 shows another embodiment of an electric arrangement to control an electric motor.

FIG. 2 shows another embodiment of an electric arrangement 1 to control an electric motor 1100. The electric arrangement comprises a system 100 to provide a supply voltage to a motor position sensor device 1000 of an electric motor 1100. The electric system 100 comprises the electric motor 1100 including the motor position sensor device 1000 to detect a position of the rotor. The electric motor 1100 may comprise a stationary stator with a plurality of coils being excited by exciting alternating current voltages U, V, W provided on supply lines L1, L2, L3. The electric motor 1100 comprises a movable rotor which may comprise a permanent magnet. If the coils of the stator are excited by the exciting alternating current voltages U, V, W, a rotational magnetic field is generated in the stator of the electric motor which influences the rotor so that a rotational movement of the rotor is caused, if the coils are driven by appropriate exciting voltages U, V, W.

The electric system 100 further comprises a motor control driver device 2000 to control the electric motor 1100. The motor control driver device comprises an exciting alternating current voltage generation circuit 2100 to generate the exciting voltages U, V, W for supplying to the coils of the stator of the electric motor 1100. In the embodiment shown in FIG. 2 the electric motor 1100 may comprise three coils, wherein each of the coils is excited by one of the exciting alternating current voltages U, V, W to generate the rotational magnetic field in the electric motor 1100.

The motor control driver device 2000 comprises a motor controller circuit 2200. The motor position sensor device 1000 is configured to detect a position of the rotor of the electric motor in relation to the coils of the stator and generates evaluation signals ES indicating the detected position of the rotor. The evaluation signals ES are transferred via channel C for further evaluation to the motor controller circuit 2200. The motor controller circuit 2200 evaluates the evaluation signals ES of the motor position sensor device 1000 and controls the exciting alternating current voltage generation circuit 2100 to generate the exciting voltages U, V, W in dependence on the evaluation signals of the motor position sensor device 1000 and thus in dependence on the current position of the rotor so that a continuous rotational movement of the rotor can be obtained.

The electric system 100 further comprises a supply voltage generation device 1200 to provide a redundant/auxiliary second supply voltage VDDN and a coupling device 1300 to couple at least one of the exciting alternating current voltages U, V, W out of the respective supply lines L1, L2 and L3. The coupling device 1300 is connected to the supply voltage generation device 1200 to transfer the coupled out at least one exciting alternating current voltage U, V, W to the supply voltage generation device 1200. The supply voltage generation device 1200 generates the second redundant supply voltage VDDN to operate the motor position sensor device 1000 in the operation mode in which the motor position sensor device 1000 detects a position of the rotor of the electric motor 1100 in relation to the coils of the stator of the electric motor.

In a normal operation mode the motor position sensor device 1000 is supplied from the motor controller device 2200 by a first (main) supply voltage VDD via channel C to be operated in an operation mode in which the motor position sensor device 1000 detects the current position of the rotor in relation to the coils of the stator. If the provision of the first supply voltage VDD is broken, the motor position sensor device receives the redundant second supply voltage VDDN from the supply voltage generation device 1200 so that a failure of the electric motor 1100 due to a faulty generation or transfer of the first supply voltage VDD can be avoided. In case of an erroneous generation of the first supply voltage VDD the motor position sensor device 1000 is power supplied from the supply voltage generation device 1200 by the auxiliary second supply voltage VDDN so that the operation of the motor position sensor device 1000 and thus of the motor 1100 need not to be interrupted.

Figure 3:
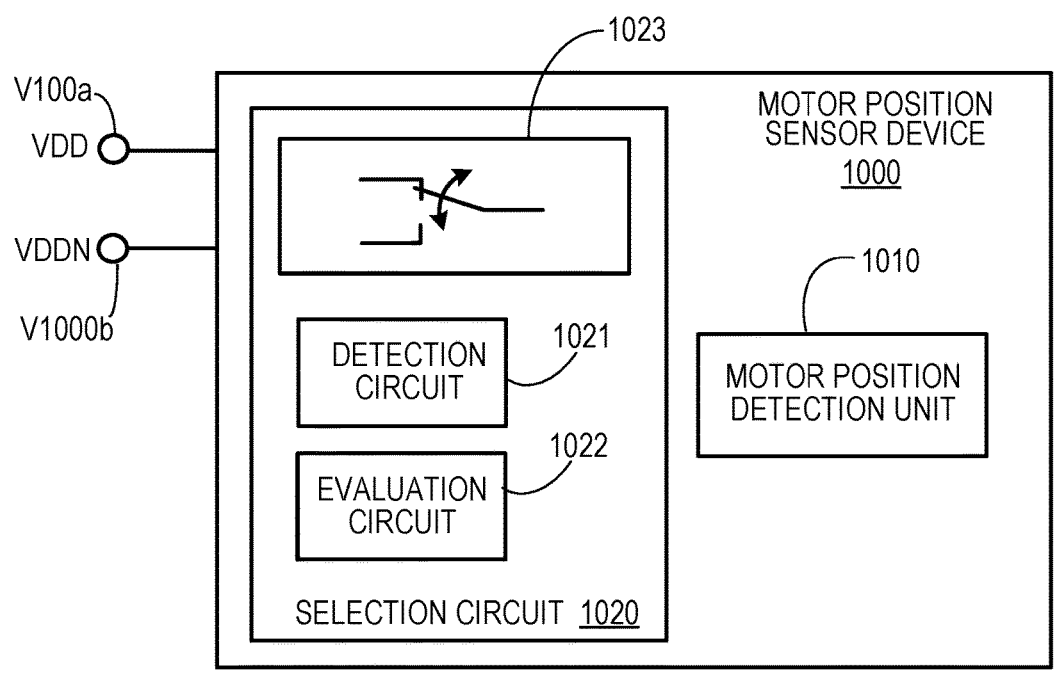
FIG. 3 shows an embodiment of motor position sensor device.

FIG. 3 shows an embodiment of the motor position sensor 1000. The motor position sensor device 1000 comprises a supply terminal V1000a to supply the first supply voltage VDD and a supply terminal V1000b to supply the second supply voltage VDDN. The motor position sensor device 1000 further comprises a motor position detection unit 1010 which is configured to detect a position of a rotor 1110 of an electric motor 1100 in an operation mode, for example a normal operation mode, of the motor position sensor device 1000. The motor position detection unit 1010 is operated in the operation mode, if the motor position detection unit 1010 is power supplied by one of the supply voltages VDD and VDDN. The motor position detection unit 1010 may comprise at least one Hall sensor, for example an array of Hall sensors, to detect the position of the rotor in the rotational magnetic field generated by the coils of the stator of the electric motor.

Figure 4:
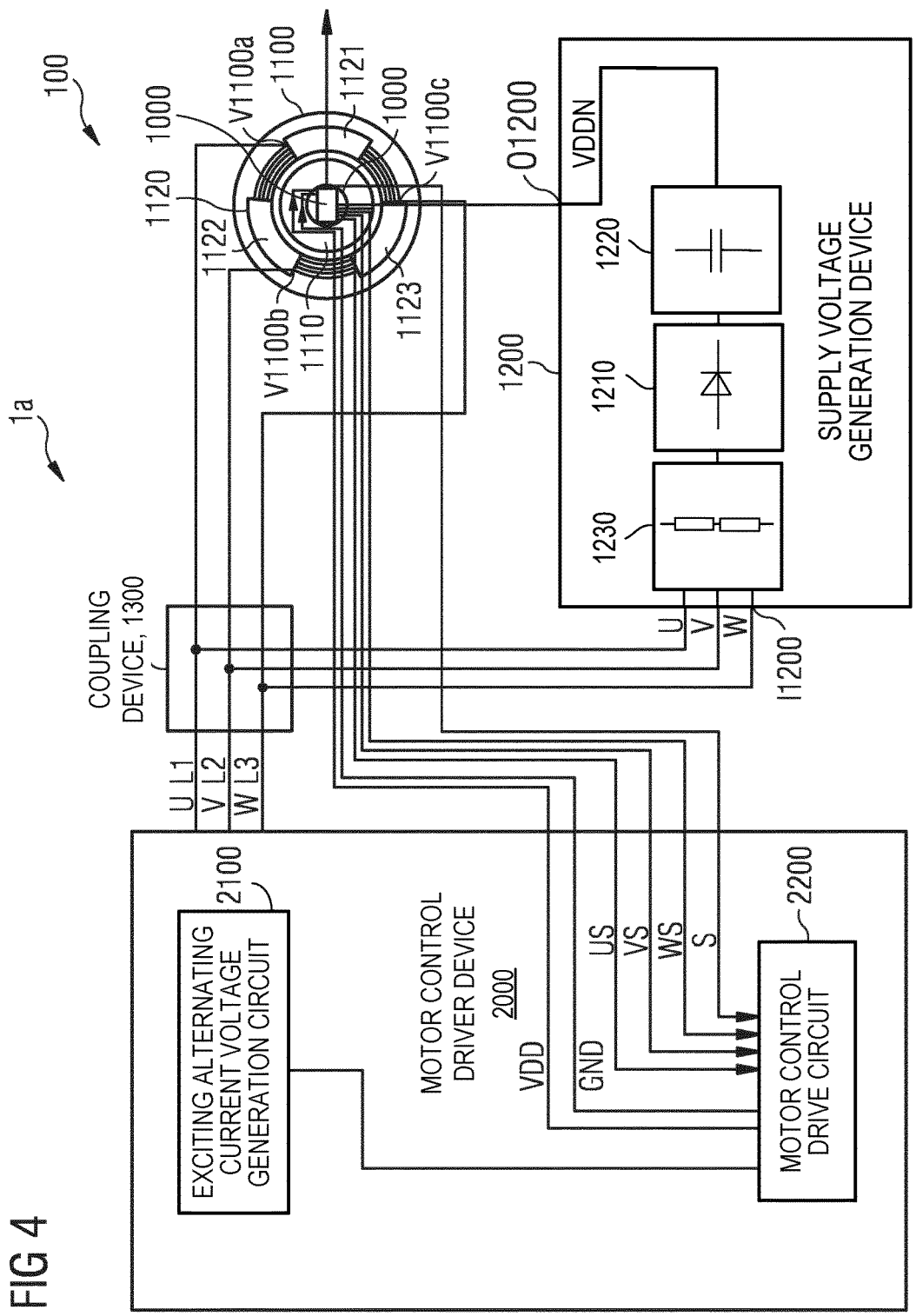
FIG. 4 shows an embodiment of an electric arrangement to control an electric motor with an electric system to provide a supply voltage to a motor position sensor device of the electric motor.
Figure 5:
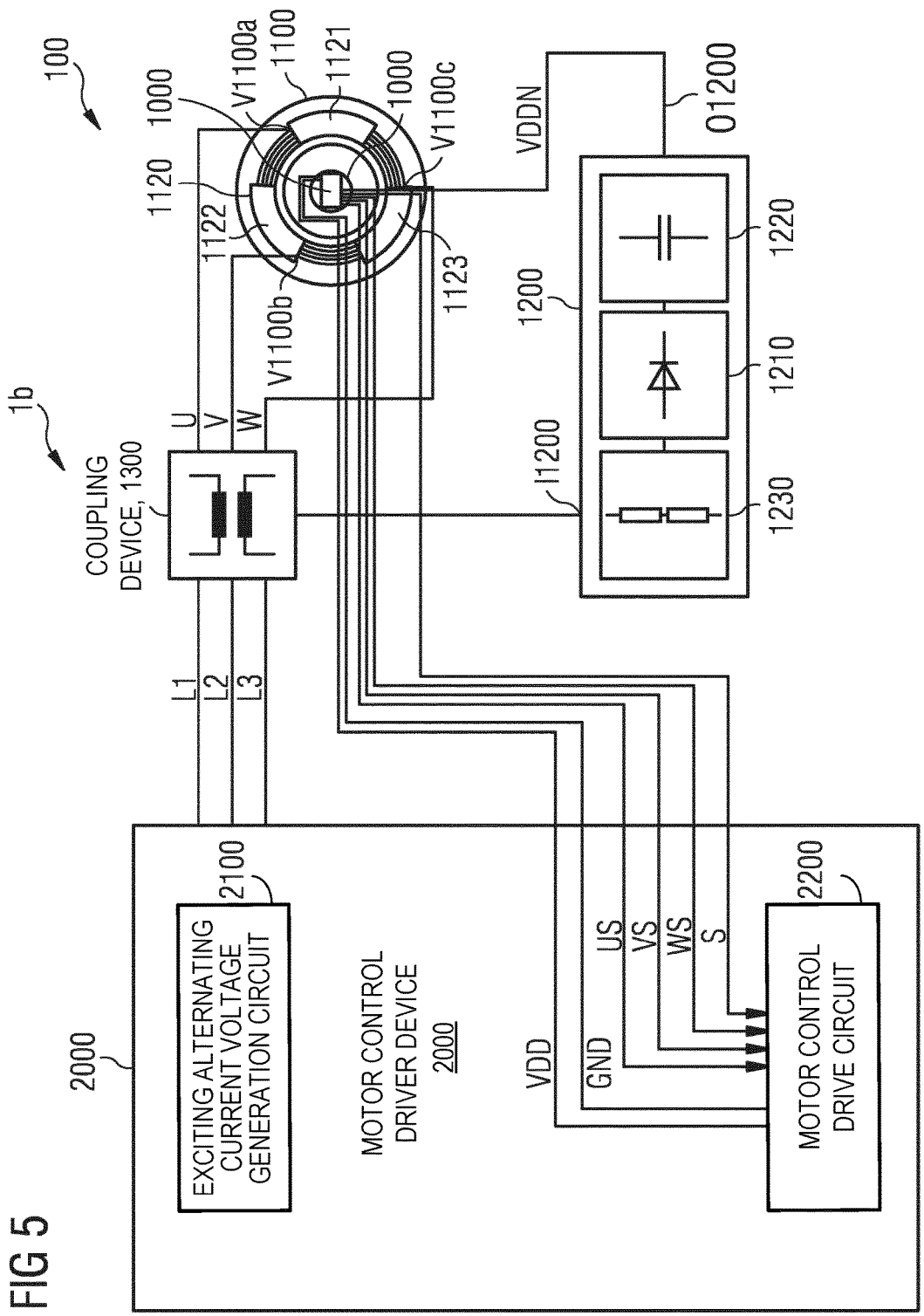
FIG. 5 shows another embodiment of an electric arrangement to control an electric motor with an electric system to provide a supply voltage to a motor position sensor device of the electric motor.

The electric motor 1100 with the rotor 1110 surrounded by a stationary stator 1120 is shown in FIGS. 4 and 5. The motor position sensor device 1000 may comprise a selection circuit 1020 to selectively couple one of supply terminals V1000a and V1000b to the motor position detection unit 1010. The motor position sensor device 1000 is configured to be operated in the operation mode, if one of the supply voltages VDD and VDDN is provided to the motor position detection unit 1010 with a voltage level above a threshold level. The selection circuit 1020 is configured to couple the supply terminal V1000a to the motor position detection unit 1010, if a level of the supply voltage VDD is above the threshold level. The selection circuit is further configured to couple the supply terminal V1000b to the motor position detection unit 1010, if the level of the supply voltage VDD is below the threshold level and the level of the supply voltage VDDN is above the threshold level.

According to a possible embodiment, the motor position sensor device 1000 may comprise a detection circuit 1021 to detect the respective level of each of the supply voltages VDD and VDDN and an evaluation circuit 1022 to evaluate the respective detected level of the supply voltages VDD and VDDN. The selection circuit 1020 may include the detection circuit 1021 and the evaluation circuit 1022. The selection circuit 1020 is configured to couple the supply terminal V1000a to the motor position detection unit 1010, if the evaluation circuit 1022 detects that the detected level of the supply voltage VDD is above the threshold level. The selection circuit 1020 is further configured to couple the supply terminal V1000b to the motor position detection unit 1010, if the evaluation circuit 1022 evaluates that the detected level of the supply voltage VDD is below the threshold level and the detected level of the supply voltage VDDN is above the threshold level.

The selection circuit 1020 may comprise at least one controllable switch 1023. The at least one controllable switch 1023 is configured to selectively couple one of the supply terminals V1000a and V1000b to the motor position detection unit 1010.

FIGS. 4 and 5 show two different embodiments 1a and 1b of an electric arrangement to control an electric motor 1100. Electric components and its function which are common in both embodiments of FIGS. 4 and 5 are described in the following before the difference between the embodiments of the electric arrangement is explained.

The electric arrangements 1a and 1b comprises an electric system 100 to provide one of the supply voltage VDD and the auxiliary supply voltage VDDN to the motor position sensor device 1000 and a motor control driver device 2000 to control the function of the electric motor 1100. The electric system 100 comprises the motor position sensor 1000 arranged at the electric motor 1100, the supply voltage generation device 1200 and the coupling circuit 1300.

According to a possible embodiment, the electric motor 1100 may comprise the motor position sensor device 1000 and a rotor 1110. The motor position sensor device 1000 may be arranged such that the motor position sensor device is coupled to the movement of the rotor. The motor position sensor device 1000 may be arranged at the rotor 1110. The motor position sensor device 1000 may be configured as a chip which is mounted on the rotor 1110 of the electric motor. The electric motor 1100 further comprises a stationary stator 1120 surrounding the rotor 1110. The stator 1120 comprises a plurality of coils 1121, 1122, 1123 to generate a rotating magnetic field around the rotor 1110 such that the rotor 1110 and the motor position sensor device 1000 is influenced by the rotating magnetic field. The electric motor 1100 furhter comprises a plurality of terminals V1100a, V1100b, V1100c to apply a respective exciting alternating current voltage U, V, W to the plurality of coils 1121, 1122, 1123 to excite a respective part of the rotating magnetic field. The electric motor may be configured as a brushless direct current motor. The supply voltage generation device 1200 may have an input side I1200 to apply the respective exciting alternating current voltages U, V, W and an output side O1200 to provide the supply voltage VDDN. The supply voltage generation device 1200 is configured to generate the supply voltage VDDN in dependence on at least one of the exciting alternating current voltages U, V, W. The supply terminal V1000b of the motor position sensor device 1000 may be connected to the output side O1200 of the supply voltage generation circuit 1200.

According to a possible embodiment, the supply voltage generation device 1200 may comprise a voltage rectifier 1210 being configured to rectify the at least one of the exciting alternating current voltages U, V, W and to provide a rectified voltage for generating the supply voltage VDDN. The supply voltage generation device 1200 may comprise a smoothing circuit 1220 to smooth the rectified voltage for generating the supply voltage VDDN.

According to another embodiment, the supply voltage generation device 1200 comprises a voltage divider circuit 1230 to divide the at least one of the exciting alternating current voltages U, V, W and to provide a divided voltage. The voltage rectifier 1210 is configured to rectify the divided voltage and to provide the rectified voltage for generating the supply voltage VDDN.

The electric system 100 may comprise a plurality of supply lines L1, L2, L3. Each of the supply lines L1, L2, L3 may be configured to provide one of the exciting alternating current voltages U, V, W to one of the plurality of coils 1121, 1122, 1123 of the stator 1120 of the electric motor 1100. The electric system 100 further comprise the coupling unit 1300 to couple the at least one of the exciting alternating current voltages U, V, W out of the respective one of the supply lines L1, L2, L3. The coupling unit 1300 is connected to the input side I1200 of the supply voltage generation device 1200 to provide the coupled out one of the at least one exciting alternating current voltages U, V, W to the input side I1200 of the supply voltage generation device 1200.

The motor control driver device 2000 of the electric arrangement 1a and 1b comprises an exciting alternating current voltage generation circuit 2100 to generate the exciting alternating current voltages U, V, W at the supply lines L1, L2, L3 and a motor controller circuit 2200 to control the exciting alternating current voltage generation circuit 2100. The motor position sensor device 1000 is configured to provide evaluation signals US, VS, WS indicating the position of the rotor 1110 of the electric motor device 1100 to the motor controller circuit 2200. The motor controller circuit 2200 is configured to control the generation of the exciting alternating current voltages U, V, W by the exciting alternating current voltage generation circuit 2100 in dependence on the evaluation signals US, VS, WS of the motor position sensor device 1000.

According to a possible embodiment of the electric arrangement 1a and 1b, the motor control driver device 2000 is configured to provide the supply voltage VDD to the supply terminal V1000a of the motor position sensor device 1000. The motor position sensor device 1000 is configured to provide a sense signal S with a first level to the motor controller circuit 2200 of the motor control driver device 2000, if the evaluation circuit 1022 of the motor position sensor device 1000 detects that the level of the supply voltage VDD is above the threshold level. The motor position sensor device 1000 is configured to provide the sense signal S with a second level to the motor controller circuit 2200 of the motor control driver device 2000, if the evaluation circuit 1022 of the motor position sensor device 1000 detects that the level of the supply voltage VDD is below the threshold level. The motor control circuit 2200 of the motor control driver device 2000 is further configured to control the exciting alternating current voltage generation circuit 2100 such that the generation of the exciting alternating current voltages U, V, W is interrupted, if the motor position sensor device 1000 provides the sense signal S with the second level.

According to the embodiment 1a of the electric arrangement to control the electric motor, the coupling unit 1300 is configured to galvanically couple the at least one of the exciting alternating current voltages U, V, W out of the respective one of the supply lines L1, L2, L3. According to the embodiment 1b of the electric arrangement to control the electric motor the coupling unit 1300 is configured to inductively couple the at least one of the exciting alternating current voltages U, V, W out of the respective one of the supply lines L1, L2, L3. According to an alternative embodiment of the electric arrangement not shown in the Figures, the coupling unit 1300 may also be configured to capacitively couple the at least one of the exciting AC voltages U, V, W out of the respective supply lines L1, L2, L3.

The electric arrangements 1a and 1b to control the electric motor 1100 enable to continue the function of the electric motor 1100 even if the main power supply VDD fails. The supply voltage generation device 1200 and the coupling device 1300 are configured to provide a backup power supply voltage VDDN which is provided to the motor position sensor 1000 to prevent a failure in the detection of the position of the rotor in the rotational magnetic field of the coils of the stator. In contrast to a solution using a main motor position sensor 1000a and an auxiliary motor position sensor 1000b, the embodiments 1a and 1b of the electric arrangement to control the electric motor reduces the number of required data and supply channels, the number of provided motor position sensor devices and the number of motor controller circuits with the result of cost reduction in relation to the motor control driver device 2000 and cost reduction of the cable harness connecting the motor control driver device 2000 to the electric motor 1100.

Many modifications and other embodiments set forth herein will come to mind to one skilled in the art to which the embodiments pertain having the benefit of the teachings presented in the foregoing descriptions and the associated drawings. Therefore, it is to be understood that the description and the claims are not to be limited to the specific embodiments disclosed and that modifications and other embodiments are intended to be included within the scope of the appended claims. It is intended that embodiments cover the modifications and variations of the embodiments provided they come within the scope of the appended claims and their equivalents. Although specific terms are employed herein, they are used in a generic and descriptive sense only and not for purposes of limitation.

The invention claimed is:

1. An electric system to provide a supply voltage to a motor position sensor device of an electric motor, comprising:
   a supply voltage generation device,
   wherein the electric motor comprises
      a rotor,
      a stator comprising a plurality of coils to generate a rotating magnetic field around the rotor such that the rotor and the motor position sensor device are influenced by the rotating magnetic field, and
      a plurality of terminals to apply a respective exciting alternating current voltage to the plurality of coils to excite a respective part of the rotating magnetic field,
   wherein the motor position sensor device comprises
      a first supply terminal to supply a first supply voltage and a second supply terminal to supply a second supply voltage, and
      a motor position detection unit being configured to detect a position of the rotor of the electric motor in an operation mode of the motor position sensor device, in which the motor position detection unit is supplied by one of the first and second supply voltage,
   wherein the supply voltage generation device has an input side to apply the respective exciting alternating current voltages and an output side to provide the second supply voltage,
   wherein the supply voltage generation device is configured to generate the second supply voltage in dependence on at least one of the exciting alternating current voltages, and
   wherein the second supply terminal of the motor position sensor device is connected to the output side of the supply voltage generation device.

2. The electric system of claim 1, wherein the motor position detection unit comprises at least one Hall sensor.

3. The electric system of claim 1, wherein the motor position sensor device is arranged such that the motor position sensor device is coupled to the movement of the rotor.

4. The electric system of claim 1, wherein the electric motor is configured as a brushless direct current motor.

5. The electric system of claim 1, wherein the supply voltage generation device comprises a voltage rectifier being configured to rectify the at least one of the exciting alternating current voltages and to provide a rectified voltage for generating the second supply voltage.

6. The electric system of claim 5, wherein the supply voltage generation device comprises a smoothing circuit to smooth the rectified voltage for generating the second supply voltage.

7. The electric system of claim 5, wherein the supply voltage generation device comprises a voltage divider circuit to divide the at least one of the exciting alternating current voltages and to provide a divided voltage, and
   wherein the voltage rectifier is configured to rectify the divided voltage and provide the rectified voltage for generating the second supply voltage.

8. The electric system of claim 1, wherein the motor position sensor device comprises a selection circuit to selectively couple one of the first and second supply terminal to the motor position detection unit,
- wherein the motor position sensor device is configured to be operated in the operation mode, if one of the first and second supply voltage is provided to the motor position detection unit with a voltage level above a threshold level,
- wherein the selection circuit is configured to couple the first supply terminal to the motor position detection unit, if a level of the first supply voltage is above the threshold level, and
- wherein the selection circuit is configured to couple the second supply terminal to the motor position detection unit, if the level of the first supply voltage is below the threshold level and the level of the second supply voltage is above the threshold level.

9. The electric system of claim 8 wherein the selection circuit comprises at least one controllable switch, and
- wherein the at least one controllable switch is configured to selectively couple one of the first and second supply terminal to the motor position detection unit.

10. The electric system of claim 8, comprising:
a detection circuit to detect the respective level of the first and second supply voltage; and
an evaluation circuit to evaluate the respective detected level of the first and second supply voltage,
- wherein the selection circuit is configured to couple the first supply terminal to the motor position detection unit, if the evaluation circuit evaluates that the detected level of the first supply voltage is above the threshold level, and
- wherein the selection circuit is configured to couple the second supply terminal to the motor position detection unit, if the evaluation circuit evaluates that the detected level of the first supply voltage is below the threshold level and the detected level of the second supply voltage is above the threshold level.

11. The electric system of claim 10, comprising:
a plurality of supply lines, wherein each of the supply lines is configured to provide one of the exciting alternating current voltages to one of the plurality of coils of the stator of the electric motor; and
a coupling device to couple the at least one of the exciting alternating current voltages out of the respective one of the supply lines,
- wherein the coupling device is connected to the input side of the supply voltage generation device to provide the coupled out one of the at least one exciting alternating current voltages to the input side of the supply voltage generation device.

12. An electric device to control an electric motor, comprising:
an electric system to provide a supply voltage to a motor position sensor device of the electric motor, comprising:
a supply voltage generation device,
wherein the electric motor comprises
- a rotor,
- a stator comprising a plurality of coils to generate a rotating magnetic field around the rotor such that the rotor and the motor position sensor device are influenced by the rotating magnetic field, and
- a plurality of terminals to apply a respective exciting alternating current voltage to the plurality of coils to excite a respective part of the rotating magnetic field,
wherein the motor position sensor device comprises
- a first supply terminal to supply a first supply voltage and a second supply terminal to supply a second supply voltage, and
- a motor position detection unit being configured to detect a position of the rotor of the electric motor in an operation mode of the motor position sensor device, in which the motor position detection unit is supplied by one of the first and second supply voltage,
wherein the supply voltage generation device has an input side to apply the respective exciting alternating current voltages and an output side to provide the second supply voltage,
wherein the supply voltage generation device is configured to generate the second supply voltage in dependence on at least one of the exciting alternating current voltages,
wherein the second supply terminal of the motor position sensor device is connected to the output side of the supply voltage generation device,
wherein the motor position sensor device comprises a selection circuit to selectively couple one of the first and second supply terminal to the motor position detection unit,
wherein the motor position sensor device is configured to be operated in the operation mode, if one of the first and second supply voltage is provided to the motor position detection unit with a voltage level above a threshold level,
wherein the selection circuit is configured to couple the first supply terminal to the motor position detection unit, if a level of the first supply voltage is above the threshold level,
wherein the selection circuit is configured to couple the second supply terminal to the motor position detection unit, if the level of the first supply voltage is below the threshold level and the level of the second supply voltage is above the threshold level;
a detection circuit to detect the respective level of the first and second supply voltage;
an evaluation circuit to evaluate the respective detected level of the first and second supply voltage,
wherein the selection circuit is configured to couple the first supply terminal to the motor position detection unit, if the evaluation circuit evaluates that the detected level of the first supply voltage is above the threshold level,
wherein the selection circuit is configured to couple the second supply terminal to the motor position detection unit, if the evaluation circuit evaluates that the detected level of the first supply voltage is below the threshold level and the detected level of the second supply voltage is above the threshold level;
a plurality of supply lines, wherein each of the supply lines is configured to provide one of the exciting alternating current voltages to one of the plurality of coils of the stator of the electric motor;
a coupling device to couple the at least one of the exciting alternating current voltages out of the respective one of the supply lines,
wherein the coupling device is connected to the input side of the supply voltage generation device to provide the coupled out one of the at least one exciting alternating current voltages to the input side of the supply voltage generation device; and
a motor control driver device to control the electric motor and the motor position sensor device, wherein the motor control driver device comprises an exciting alternating current voltage generation circuit to generate the exciting alternating current voltages at the supply lines and a motor controller circuit to control the exciting alternating current voltage generation circuit, wherein the motor position sensor device is configured to provide evaluation signals indicating the position of the rotor of the electric motor to the motor controller circuit, and wherein the motor controller circuit is configured to control the generation of the exciting alternating current voltages by the exciting alternating current voltage generation circuit in dependence on the evaluation signals of the motor position sensor device.

13. The electric device of claim 12, wherein the motor control driver device is configured to provide the first supply voltage to the first supply terminal of the motor position sensor device, wherein the motor position sensor device is configured to provide a sense signal with a first level to the motor control circuit of the motor control driver device, if the evaluation circuit of the motor position sensor device detects that the level of the first supply voltage is above the threshold level, wherein the motor position sensor device is configured to provide the sense signal with a second level to the motor control circuit of the motor control driver device, if the evaluation circuit of the motor position sensor device detects that the level of the first supply voltage is below the threshold level, and wherein the motor control circuit of the motor control driver device is configured to control the exciting alternating current voltage generation circuit such that the generation of the exciting alternating current voltages is interrupted, if the motor position sensor device provides the sense signal with the second level.

* * * * *